Aug. 1, 1933.        J. L. HECHT        1,920,859
METAL WHEEL STRUCTURE
Filed Sept. 9, 1930        3 Sheets-Sheet 1
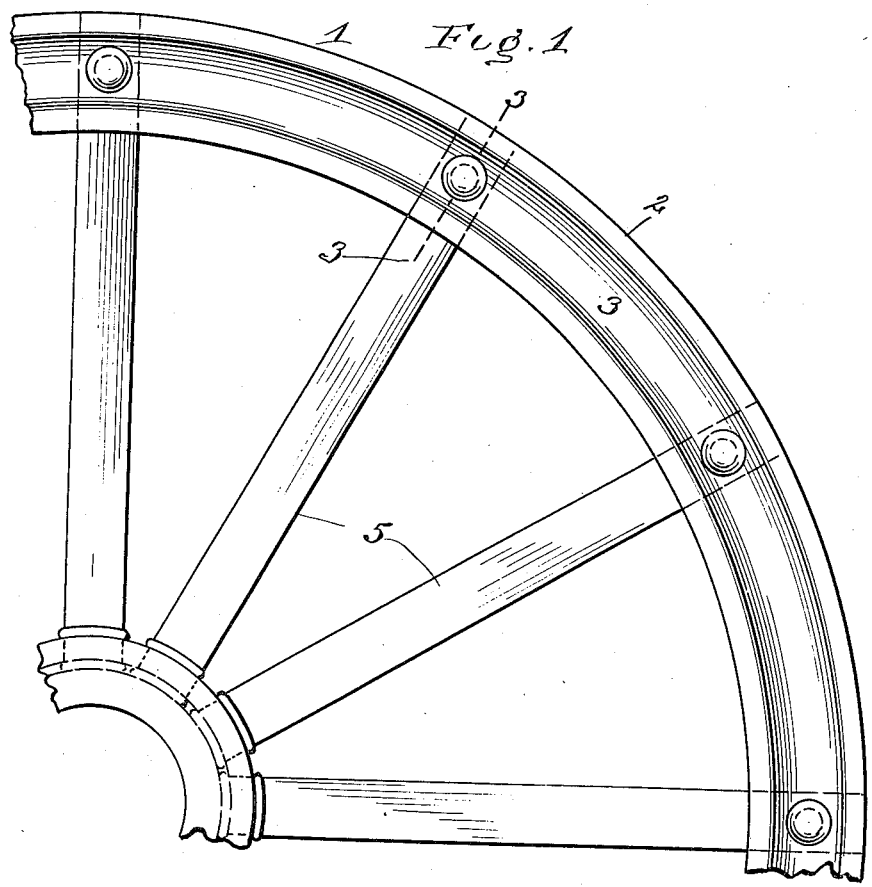
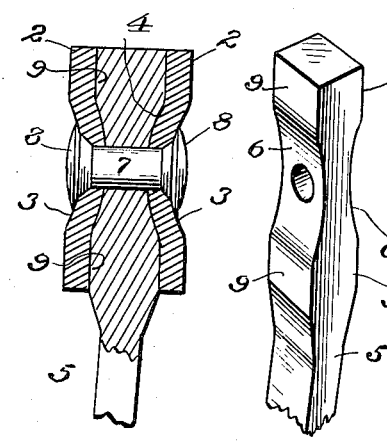 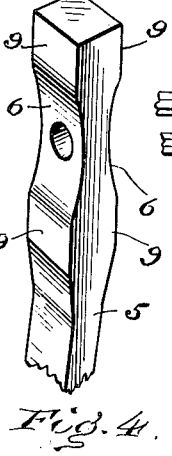 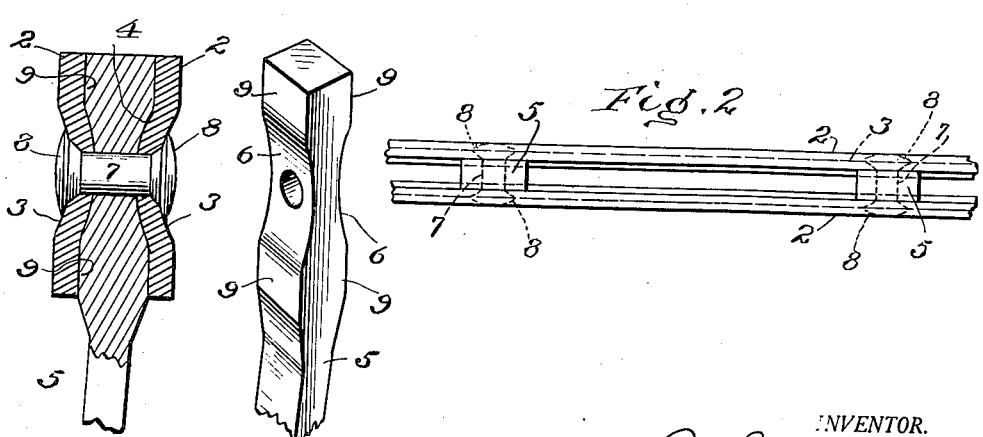
INVENTOR.
J. L. Hecht
BY
Morrison, Kennedy & Campbell
ATTORNEYS.

Aug. 1, 1933.　　　　J. L. HECHT　　　　1,920,859
METAL WHEEL STRUCTURE
Filed Sept. 9, 1930　　3 Sheets-Sheet 2
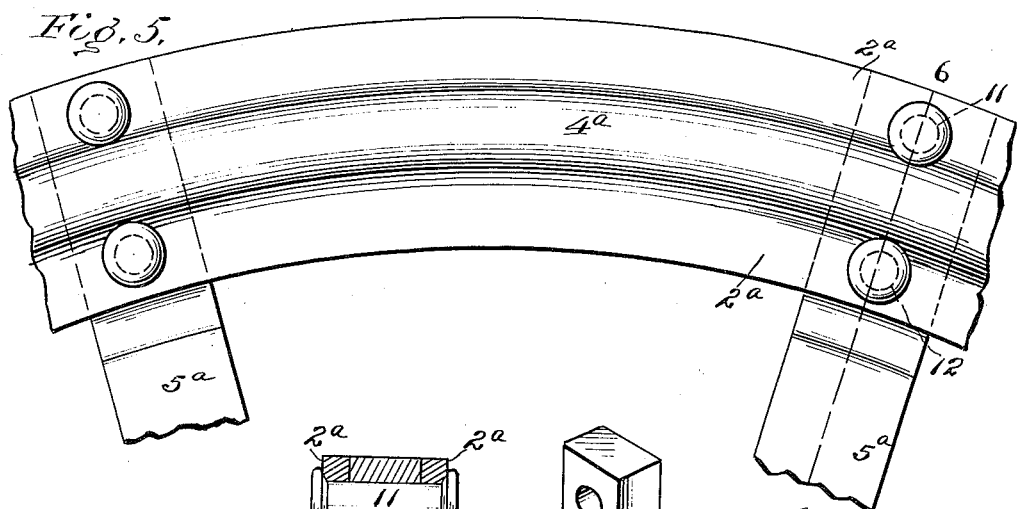
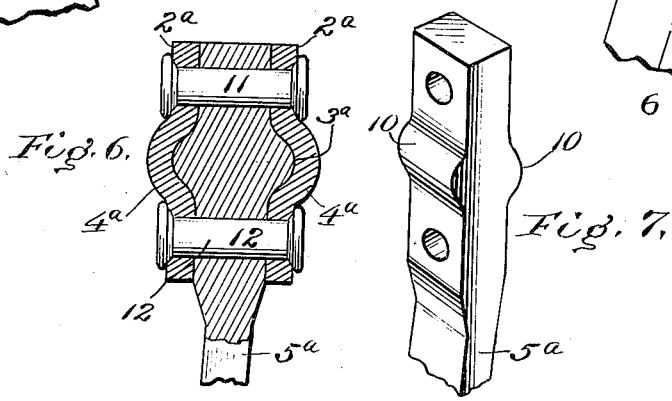
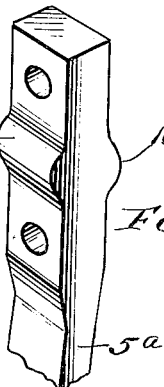
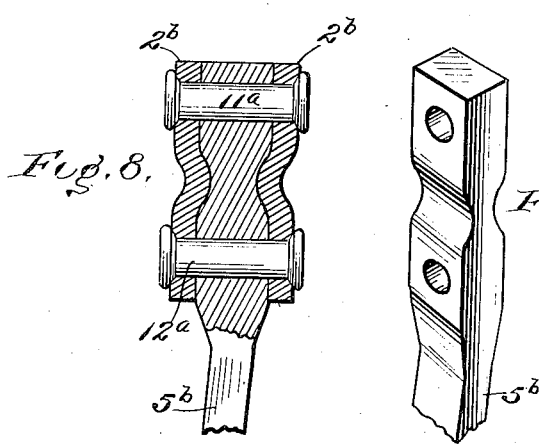
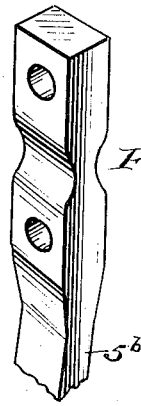
INVENTOR.
J. L. Hecht
BY
Morrison, Kenney Campbell
ATTORNEYS.

Aug. 1, 1933.         J. L. HECHT         1,920,859
               METAL WHEEL STRUCTURE
            Filed Sept. 9, 1930       3 Sheets-Sheet 3
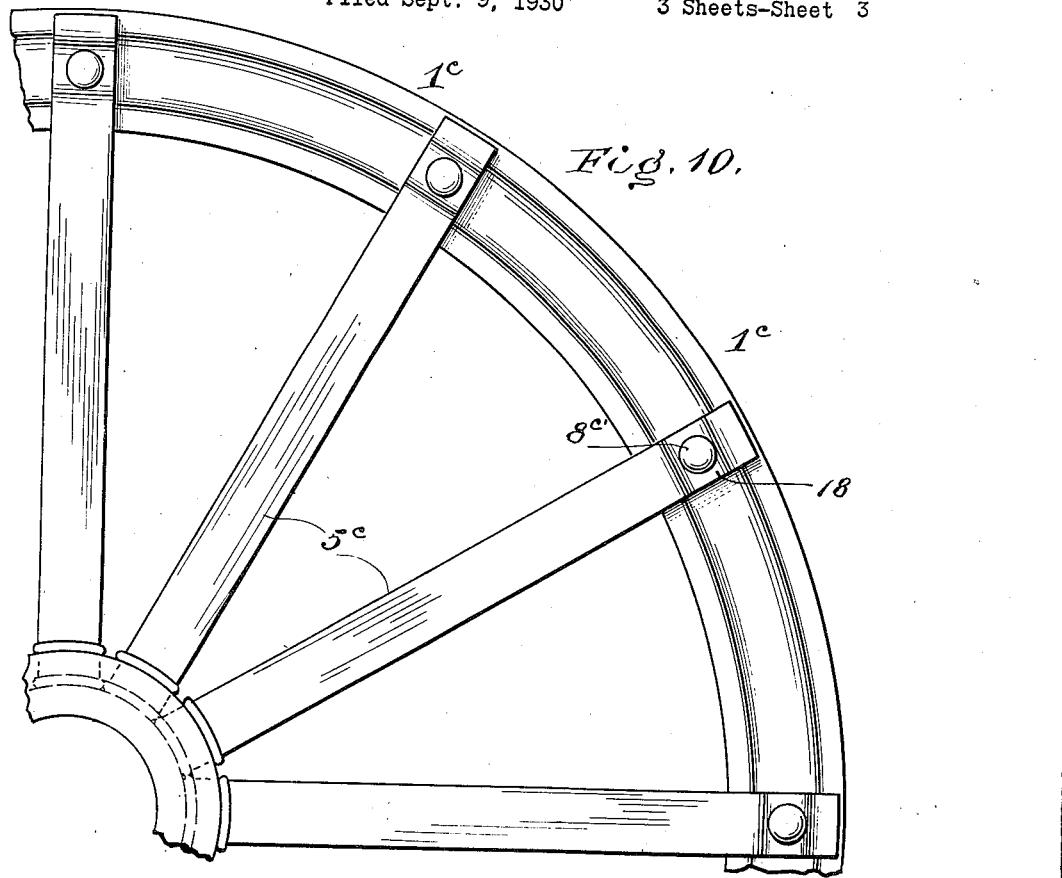
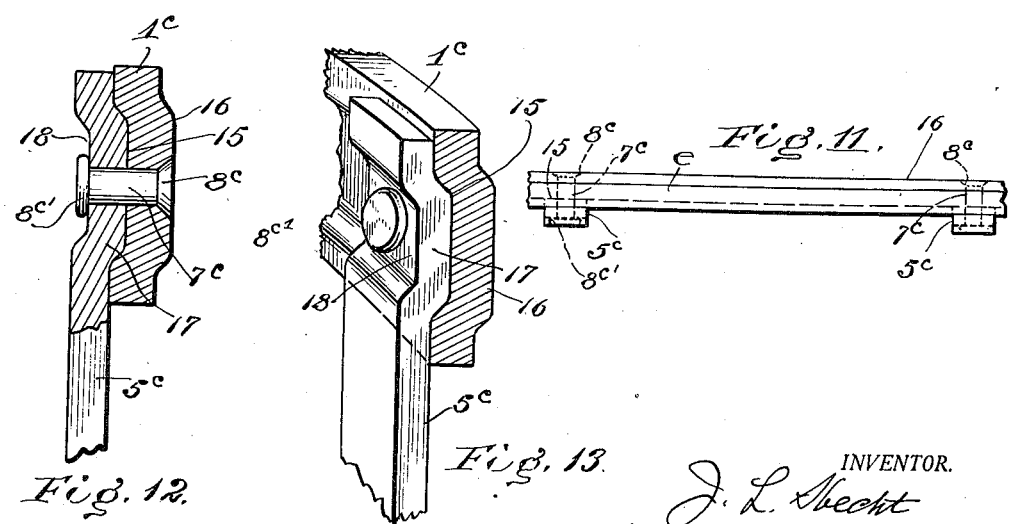
INVENTOR.
J. L. Hecht
BY
Morrison, Kennedy Campbell
ATTORNEYS Patented Aug. 1, 1933

1,920,859

UNITED STATES PATENT OFFICE 1,920,859

METAL WHEEL STRUCTURE

Joseph L. Hecht, Davenport, Iowa, assignor to French & Hecht Incorporated, a Corporation of Iowa Application September 9, 1930. Serial No. 480,707

3 Claims. (Cl. 301—5)

This invention relates to wheel structures and more particularly to wheels of the type in which the rim member is made up of one or more flat annular sections or plates, connected to the spokes in such relation that the greater dimension of the plate will be in a vertical position relative to the ground, and the edge of the plate will therefore be presented to contact with the ground, thereby forming a tread surface of such character that it will, in the action of the wheel on the ground, reduce the packing of the soil to a minimum.

The present invention is concerned with the specific form of the annular rim section or sections and with the form of the outer ends of the spokes to cooperate with the rim formation, thereby to produce a very effective connection of the spokes with the rim not liable to looseness, and a very strong, durable, and simple structure with a minimum amount of metal, and consequently of comparatively little weight.

With these and other objects in view, the invention consists in providing the annular rim member with a circumferential strengthening formation, such as circumferential grooves and ribs, and in giving the outer end of the spokes a shape to fit in the grooves or to otherwise interlock with the strengthening formation, and in connecting the parts by rivets, or the like, extending through the rim member and spokes and serving to maintain the interlocked relation of the parts. Due to the grooving of the rim member, it is greatly strengthened and stiffened, and by reason of the interlocking of the spoke ends with the grooved rim member, the spokes will carry much of the load imposed upon the wheel, independently of the rivets, and consequently the latter will be relieved of shearing and other strains whose tendency would be to cause looseness or separation of the connected parts.

In the specification to follow, the invention will be described in detail, and the novel features thereof will be pointed out in the appended claims.

In the accompanying drawings:

Fig. 1 is a side elevation of a portion of a wheel having my invention embodied therein in one form;

Fig. 2 is a fragmentary plan view of the same on a reduced scale;

Fig. 3 is a cross-section on the line 3—3 of Fig. 1;

Fig. 4 is a fragmentary perspective view showing the shape of the outer end of the spoke to adapt it to interlock with the rim member;

Fig. 5 is a view similar to Fig. 1 showing a modified form of the invention;

Fig. 6 is a cross-section of the same on the line 6—6;

Fig. 7 is a fragmentary perspective view showing the shape of the outer end of the spoke to adapt it to interlock with the rim member shown in Fig. 5;

Fig. 8 is a cross-sectional view of a rim member and interlocked spoke end in still another modified form;

Fig. 9 is a fragmentary perspective view of the outer end of a spoke of the form shown in Fig. 8;

Fig. 10 is a side elevation of a portion of a wheel showing a further modification of the invention;

Fig. 11 is a fragmentary plan view of the same on a reduced scale;

Fig. 12 is a cross-section on the line 12—12 of Fig. 10; and

Fig. 13 is a fragmentary sectional perspective view of the rim member and connected spoke of the form shown in Fig. 12.

Referring to the drawings:

Referring particularly to Figs. 1 to 4, the rim member 1 in this form of the invention is of the so-called "open" type, comprising two annular sections or plates 2, 2 extending side by side in spaced relations and presented edgewise to the ground, the greatest dimensions of these sections being disposed vertically relative to the ground. In accordance with the invention, these plates are provided with circumferential strengthening and stiffening formations, which in this form of the invention are produced by forming the plates with circumferential grooves 3 in their outer sides, and with corresponding circumferential ribs 4 on their inner sides, the effect of which is to corrugate the plates circumferentially and thus stiffen and strengthen the same. The outer ends of spokes 5 are seated between the rim sections and are interlocked with the ribs 4 thereof, each spoke for this purpose being formed in its opposite sides with groove 6 as best shown in Fig. 4, which, with the spoke ends extending between the rim sections, will receive the ribs 4 thereof, whereby the spokes are interlocked with the rim sections. Such interlocking of the parts is maintained and their firm and rigid connection effected, by means of rivets 7 which are extended through the grooved and ribbed portions of the rim sections and through the intermediate spokes, and are provided on their ends with heads 8 which are countersunk in the external grooves of the rim sections and therefore do not present external projections which would tend to carry dirt or mud in the operation of the wheel.

From the construction described it will be seen that but a single rivet is provided for each spoke, and that due to the interlocking of the spoke ends with the rim member, the weight imposed on the wheel will be borne mainly by the spokes, and the rivets will therefore be relieved of shearing strains and other strains which would tend to cause looseness and separation of the parts. Further, it will be seen that beyond the surface of the grooves in the sides of the spoke ends, the sides of the spoke ends extend both outwardly and inwardly of said groove in straight parallel lines, as at 9, and fit flatly and snugly between the corresponding surfaces in the inner sides of the rim sections, whereby the spoke ends will give the rim sections firm and solid support and will serve to space said sections uniformly and evenly throughout their circumferential extent.

In Figs. 5, 6 and 7 a modified form of the invention is shown. In this case the rim member 1ª is, as in the construction just described, composed of two annular rim sections or plates 2ª, 2ª, but the stiffening grooves and ribs 3ª and 4ª are reversed in relation to the arrangement of Fig. 1, the grooves in this modified construction being on the inside of the rim sections, and the ribs on the outside of the same. The outer ends of the spokes 5ª are shaped to fit between the internally grooved sections so as to interlock therewith, and for this purpose said spokes are formed on opposite sides with external ribs 10, 10, which fit in the internal grooves 3ª. The parts are held in their interlocked relations and connected fixedly together, by means of outer and inner rivets 11 and 12, which extend through the rim sections, respectively, on opposite sides of the ribs 4ª and through the intermediate spoke ends, the heads 13 of these rivets being disposed inwardly of the crests of the ribs 4ª and thereby shielded and prevented from offering projections likely to carry dirt or mud.

In Figs. 8 and 9 the construction follows closely that of Figs. 1 to 4, in so far as the relative form of the ends of the spokes 5ᵇ and rim sections 2ᶜ, 2ᶜ is concerned, but in this case two rivets 11ª and 12ª are employed for each spoke similar to the arrangement of Fig. 6, instead of the single connecting rivet of Figs. 1 to 4.

In the foregoing embodiments of the invention, the rim member is composed of two annular spaced plates or sections, but the invention is not confined to such particular form of rim member, and it is applicable as well to a form of rim member such as is shown in Figs. 10 to 13. Here it will be seen that the rim member consists of a single annular plate or section 1ᶜ, and that it is as before, disposed edgewise to the ground and connects to the outer ends of spokes 5ᶜ, the ends of which spokes are, in accordance with the invention, interlocked with the rim member, and the interlocking of the parts is preserved by means of rivets 7ᶜ. To bring about this result the rim member is formed with a circumferential groove 15 and with a corresponding circumferential rib 16 on the opposite side, and the outer ends of the spokes are bent or otherwise formed so that each spoke will present on one side a rib 17 to enter the groove 15, and on the other side a groove 18; and the rivet 7ᶜ is passed through these interlocking parts and has one of its heads 8ᶜ countersunk in the rim section and its other head 8ᶜ′ countersunk in the groove 18 in the spoke end. As a result of this arrangement, there will be no projecting parts which would tend to carry dirt.

This particular form of the invention functions similar to the other forms described, in presenting a strengthened and stiffened rim member with its greater dimension disposed vertically to the ground, and spokes interlocked with said rim member and maintained in interlocked relations by a rivet, which spokes by reason of their interlocking connection with the rim section, take the main load imposed on the wheel, independently of the rivets, and thus prevent shearing strain on the rivets and other injurious strains.

From the foregoing description it will be realized that a wheel of simple and light construction is produced, of great strength and durability and requiring in its manufacture a minimum amount of material, and in which the spokes take the greater load independently of the connecting rivets, thereby relieving the latter of shearing stresses; and it will be understood that the invention may be embodied in a wheel of the "open" type, or a wheel in which the rim member is in the form of a single section, or in other forms of wheels where the conditions are such as to render the use of the invention desirable.

While in the form of the invention illustrated, the strengthening formation is shown as being constituted by continuous circumferential rib and corresponding groove, it will be understood that the rib and groove may be made discontinuous or at intervals around the rim section, corresponding to the location of the spoke ends, without departing from the spirit of the invention, for in such case while the strengthening or reinforcing of the rim may not be as great as if the rib and groove were continuous, yet the spokes may be interlocked with the rim with all of the advantages incident to the construction first described.

In all of the forms of interlocking relation between the spokes and rim member, the interlocking is such, that without regard to the connecting rivets which are for the main purpose of maintaining the interlocking relations, the spoke can not move radially in either direction. In other words, it is interlocked in such a way as to be held against radial movement in both directions. This is an important feature of the invention, since dependence is not placed on the rivets to prevent radial relative movement of the spokes, and therefore such rivets are not subjected to shearing action. The construction embodied in a wheel wherein the rim is adapted to contact directly with the ground as in the present case, constitutes a very rigid, compact, firm and effective structure in respect to the connection of the spokes with the rims in such a way as to reduce to a minimum the liability of displacement or looseness.

While in the foregoing description and accompanying drawings the invention has been disclosed in forms which will realize satisfactorily the objects and advantages of the same, it will be understood that the detailed form of the parts may be variously changed and modified without departing from the limits of the invention; and further it will be understood that the invention is not limited to any particular form or construction of the parts, except in so far as such limitations are specified in the claims.

Having thus described my invention, what I claim is:

1. In a metal wheel, the combination of an annular rim member presented edgewise to the ground and provided with a circumferentially extending strengthening formation, spokes connected to the rim member and provided at their outer ends each with a circumferentially extending formation to interlock with said strengthening formation on the rim, the interlocking formations being so constructed and arranged that force exerted on the rim is transmitted directly to the spokes through said interlocking formations, said interlocking formations also preventing relative radial movement between the rim and the spokes, and means holding the rim member and spokes together and serving to hold said parts interlocked.

2. In a metal wheel, the combination of an annular rim member presented edgewise to the ground and provided in one side with a circumferentially extending groove, spokes connected to the rim and provided at their outer ends each with a circumferentially extending protuberant side formation to seat in said groove, the groove and protuberant side formation being so constructed and arranged that force exerted on the rim is transmitted directly to the spokes, and further that relative radial movement between the rim and spokes is prevented and means holding the rim member and spokes together and serving to hold the parts interlocked.

3. In a metal wheel, the combination of an annular rim member presented edgewise to the ground for direct contact therewith, and provided in one side with a circumferentially extending groove and on the other side with a corresponding rib to strengthen said member, spokes connected to the rim provided at their outer ends each with a circumferentially extending rib on one side and with a corresponding groove on the other side, the ribs on the spokes being seated in the groove in the rim member to interlock therewith whereby force exerted on the rim is transmitted directly to the spokes through the interlocking connection, and further to prevent relative radial movement between the rim and the spokes, and rivets extending through the ribs on the rim member and spokes and having their heads countersunk in the grooves in the spokes, said rivets serving to hold the parts interlocked.

JOSEPH L. HECHT.